US 11,443,351 B1

(12) United States Patent
Blaisdell et al.

(10) Patent No.: US 11,443,351 B1
(45) Date of Patent: Sep. 13, 2022

(54) MILEAGE REIMBURSEMENT AS A SERVICE

(71) Applicant: Motus, LLC, Boston, MA (US)

(72) Inventors: Rick Blaisdell, Stratham, NH (US); A. Craig Powell, Boston, MA (US); Ady Anupam Das, Braimtree, MA (US); Jeff Duke Logan, Somerville, MA (US); Scott David Wakefield Rankin, DeWitt, MI (US); John J. Petrucelli, East Kingston, NH (US)

(73) Assignee: Motus, LLC, Boston, MA (US)

( * ) Notice: Subject to any disclaimer, the term of this patent is extended or adjusted under 35 U.S.C. 154(b) by 130 days.

(21) Appl. No.: 16/121,557

(22) Filed: Sep. 4, 2018

Related U.S. Application Data

(60) Provisional application No. 62/553,662, filed on Sep. 1, 2017.

(51) Int. Cl.
| | | |
|---|---|---|
| *G06Q 30/02* | (2012.01) | |
| *G06Q 30/04* | (2012.01) | |
| *G07C 5/00* | (2006.01) | |
| *G06Q 40/08* | (2012.01) | |
| *G06Q 50/30* | (2012.01) | |
| *G07C 5/08* | (2006.01) | |
| *G06F 16/29* | (2019.01) | |

(52) U.S. Cl.
CPC ........ *G06Q 30/0284* (2013.01); *G06F 16/29* (2019.01); *G06Q 30/04* (2013.01); *G06Q 40/08* (2013.01); *G06Q 50/30* (2013.01); *G07C 5/008* (2013.01); *G07C 5/085* (2013.01)

(58) Field of Classification Search
CPC .................................................. G06Q 30/0284
See application file for complete search history.

(56) References Cited

U.S. PATENT DOCUMENTS

| | | | |
|---|---|---|---|
| 5,928,291 | A | 7/1999 | Jenkins et al. |
| 6,087,965 | A | 7/2000 | Murphy |
| 6,301,533 | B1 | 10/2001 | Markow |
| 6,741,933 | B1 | 5/2004 | Glass |
| 8,509,987 | B2 | 8/2013 | Resner |
| 8,538,789 | B1 | 9/2013 | Blank et al. |
| 8,655,544 | B2 | 2/2014 | Fletcher et al. |
| 9,286,266 | B1 | 3/2016 | Fleck et al. |
| 9,536,428 | B1 | 1/2017 | Wasserman |
| 9,773,413 | B1 | 9/2017 | Li et al. |
| 9,922,375 | B1 | 3/2018 | Neveu |
| 10,909,637 | B1 | 2/2021 | Neveu et al. |
| 2001/0020204 | A1 | 9/2001 | Runyon et al. |
| 2003/0163249 | A1 | 8/2003 | Kapolka et al. |

(Continued)

OTHER PUBLICATIONS

Motus.com, "How Your Business Can Benefit from Motus' Vehicle Reimbursement Program", available at: https://www.motus.com/how-your-business-can-benefit-from-motus-vehicle-reimbursement-program/, last accessed Mar. 23, 2022 (Year: 2016).*

(Continued)

*Primary Examiner* — Emmett K. Walsh
(74) *Attorney, Agent, or Firm* — NDWE LLP; Laura Majerus

(57) ABSTRACT

A system and method for determining how much a driver should be reimbursed for mileage based on a real time analysis of information specific to information captured in real time of the driver's location and vehicle.

21 Claims, 10 Drawing Sheets

(56) References Cited

U.S. PATENT DOCUMENTS

| | | |
|---|---|---|
| 2003/0193498 A1 | 10/2003 | Srinivasa et al. |
| 2004/0064247 A1 | 4/2004 | Davis |
| 2007/0032225 A1 | 2/2007 | Konicek et al. |
| 2007/0040700 A1 | 2/2007 | Bachelder |
| 2007/0150137 A1* | 6/2007 | Graham .................. G01C 22/00 701/33.4 |
| 2007/0250258 A1 | 10/2007 | Hager |
| 2007/0279241 A1 | 12/2007 | Jung et al. |
| 2008/0027599 A1 | 1/2008 | Logan et al. |
| 2008/0103657 A1 | 5/2008 | Norton et al. |
| 2010/0063904 A1 | 3/2010 | Ronen et al. |
| 2010/0292556 A1 | 11/2010 | Golden |
| 2011/0099126 A1 | 4/2011 | Belani et al. |
| 2012/0130636 A1 | 5/2012 | Westerlage |
| 2012/0158436 A1 | 6/2012 | Bauer et al. |
| 2012/0197484 A1 | 8/2012 | Nath et al. |
| 2012/0214466 A1 | 8/2012 | Tadayon et al. |
| 2013/0006674 A1* | 1/2013 | Bowne .................. H04W 4/40 705/4 |
| 2013/0085907 A1 | 4/2013 | Cottingham et al. |
| 2015/0120336 A1 | 4/2015 | Grokop et al. |
| 2015/0130641 A1 | 5/2015 | Rahman et al. |
| 2015/0262265 A1 | 9/2015 | Zamer |
| 2015/0348345 A1 | 12/2015 | Ogishi et al. |
| 2016/0029368 A1 | 1/2016 | Borenstein et al. |
| 2016/0048929 A1 | 2/2016 | Parento et al. |
| 2016/0055690 A1 | 2/2016 | Raina et al. |
| 2016/0063861 A1 | 3/2016 | Lee et al. |
| 2016/0065995 A1 | 3/2016 | Phillips |
| 2016/0067547 A1 | 3/2016 | Anthony et al. |
| 2016/0140533 A1 | 5/2016 | Milligan et al. |
| 2016/0156638 A1 | 6/2016 | Somani et al. |
| 2016/0205238 A1 | 7/2016 | Abramson et al. |
| 2016/0275794 A1 | 9/2016 | Chang |
| 2016/0364922 A1* | 12/2016 | Sahinoglu ............ G07C 5/0808 |
| 2017/0148324 A1 | 5/2017 | High et al. |
| 2017/0200234 A1 | 7/2017 | Morse et al. |
| 2017/0287079 A1* | 10/2017 | Bomze .................. G06Q 40/10 |
| 2017/0289759 A1 | 10/2017 | Acharya et al. |
| 2017/0337634 A1 | 11/2017 | Ehrlich et al. |
| 2017/0344924 A1* | 11/2017 | Koppensteiner-Reidy .................. G06Q 10/06312 |
| 2018/0018704 A1 | 1/2018 | Tunnell et al. |
| 2018/0025551 A1 | 1/2018 | Centner |
| 2018/0091930 A1 | 3/2018 | Jefferies |
| 2018/0103343 A1 | 4/2018 | Vangipuram |
| 2018/0240164 A1 | 8/2018 | Midtbo |

OTHER PUBLICATIONS

Advisory Action (PTOL-303) dated Jan. 29, 2021 for U.S. Appl. No. 16/103,900.

International Preliminary Reporton Patentability, PCT App. No. PCT/US2017/034031, dated Dec. 6, 2018, 10 pages.

International Search Report and Written Opinion, PCT App. No. PCT/US2017/034031, dated Aug. 2, 2017, 16 pages.

Lee Theng Hong, Android Mobile Application—Expense with Geo-Location Tracking (May 2015) (Year: 2015).

Final Office Action, U.S. Appl. No. 15/602,859, dated May 4, 2021, 40 pages.

Concur API v3, 2012, ProgrammableWeb.com, all of page. (Year: 2012), 4 pages.

Concur Rest API v3, 2012, ProgrammableWeb.com, all of Date page. (Year: 2012), 7 pages.

Non-Final Office Action, U.S. Appl. No. 16/028,354, dated Dec. 21, 2021, 26 pages.

Advisory Action, U.S. Appl. No. 16/103,900, dated Apr. 22, 2022, 4 pages.

Final Office Action, U.S. Appl. No. 15/602,859, dated Jun. 3, 2022, 43 pages.

Final Office Action, U.S. Appl. No. 16/103,900, dated Feb. 14, 2022, 17 pages.

Pettengill, The Impact of Localized Driving Costs on Vehicle Reimbursement, Aug. 19, 2015, Motus, 12 pages.

* cited by examiner

| Input | Data source |
|---|---|
| Address | Driver |
| Group vehicle type | Company |
| Vehicle Make, Model, Year | Driver |
| Vehicle Retail price | Driver |

(Per vehicle)

Figure 2B

| Input | Data source |
|---|---|
| Business Use % | Driver |
| Depreciation | Driver |
| Fixed Cost Adjustment | Driver |
| Insurance | Motus Data |
| Property Tax | Motus Data |
| Registration Fee(s) | Motus Data |
| Sales Tax | Motus Data |
| Title Fee(s) | Motus Data |

(Per vehicle)

Figure 2C

Fixed Cost

Variable Cost Inputs (Per vehicle)

| Input | Data source |
|---|---|
| Vehicle MPG Hwy<br><br>Vehicle MPG City | Driver<br>(Or could be derived from car location info) |
| Gas Price per gallon | External |
| Maintenance/Tires/Repairs per mile | External |
| Metro % | Driver<br>(Or could be derived from car location info or determined as shown in Fig. 2F) |

Figure 2E

Variable Cost

Variable Cost

MILEAGE REIMBURSEMENT AS A SERVICE

PRIORITY

This application claims priority under 35 U.S.C. § 119(e) to U.S. Provisional Application No. 62/553,662, filed Sep. 1, 2017, entitled "Mileage Reimbursement as a Service," which is herein incorporated by reference in its entirety.

FIELD

The present invention relates to a system and method for determining how much a driver should be reimbursed for mileage based on a real time analysis of fuel, maintenance, depreciation, and taxes and insurance, specific to information specific to the driver and vehicle.

BACKGROUND

The majority of business trips today are taken using personally-owned vehicles. It is common for employers to reimburse the drivers for trips in personally owned vehicles. These drivers have reimbursement needs different from those of truckers or business travelers who fly for work, making it even more challenging for businesses or individuals to track mileage and administer fair and accurate vehicle reimbursement programs. Currently, conventional business software requires employees to manually track their mileage or to use a separate application on their mobile device or vehicle to track mileage and driving activity. This is inconvenient for employees because it requires a separate mechanism for tracking mileage, and requires the user to manually copy information from the mobile device into the reimbursement program, adding inconvenience and expense to the reimbursement process. Moreover, self-reporting of mileage by drivers tends to result in incorrect reporting, not necessarily through malfeasance, but through inaccuracy and human error.

In conventional systems, a third party reimbursement system handles reimbursement to individual drivers. The drivers periodically enter their mileage for a time period and manually request reimbursement. Such a system is often termed an expense management platform. Often, such a third party system can communicate with a mileage capture solution to obtain mileage for individual drivers. Unfortunately, conventional mileage capture solutions and third party systems do not determine individual reimbursement rates for individual drivers or individual vehicles. Conventional reimbursement systems do not take into account individual driver's differing cost variations in vehicle operating costs, average mileage per vehicle, etc.

Conventional mileage reimbursement systems tend to reimburse employees using a fixed, per-mile rate. This is a simpler determination than trying to determine a vehicle-specific or driver-specific mileage rate and requires fewer inputs that must be kept up to date. As an example, conventional reimbursement systems are not able to keep track of average fuel prices or complex IRS requirements for mileage reimbursement. Furthermore, it would be difficult for the drivers to enter the average fuel costs depending on where they drive, and to enter depreciation and miniatous data for their vehicle. In addition, commute deductions are difficult to figure out, there are a lot of rules around types of employees and what commute deduction policy they can use. It would be almost impossible and would be very inaccurate if a driver tried to do this manually.

Moreover, a conventional fixed rate of reimbursement does not necessarily reflect the driver's actual costs. For example, a driver in Kansas probably has lower costs per mile to operate a vehicle than a driver in California. Reimbursing at a fixed, per-mile rate regardless of geographical location may not fairly reimburse either of these drivers, because the drivers' costs of operating their vehicle in different geographical locations are different. For example, the reimbursing business may be over-reimbursing or under-reimbursing some of its employees if the business reimburses at a fixed per-mile rate.

BRIEF DESCRIPTION OF THE FIGURES

The present invention is illustrated by way of example, and not by way of limitation, in the figures of the accompanying drawings and in which like reference numerals refer to similar elements and in which:

FIG. 2B is a diagram of a data structure in a memory of a server showing information used in the embodiment of the invention of FIGS. 2D and 2F/2G.

FIG. 2C is a diagram of a data structure in a memory of a server showing information used in the embodiment of FIG. 2D.

FIG. 2E is a diagram of a data structure in a memory of a server showing information used in the method of FIGS. 2F and 2G.

DETAILED DESCRIPTION OF EMBODIMENTS OF THE INVENTION

Figure 1:
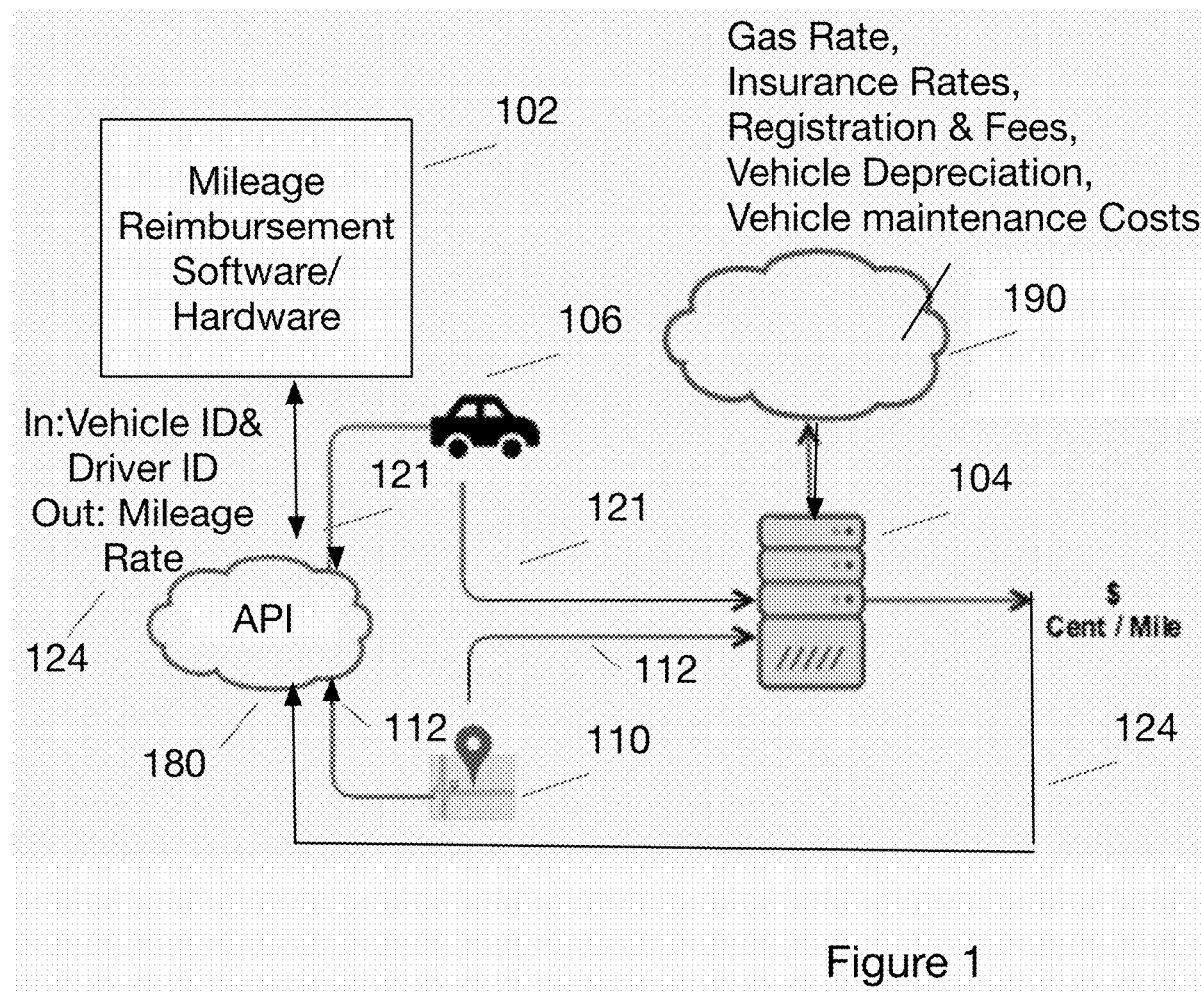
FIG. 1 is a block diagram showing an embodiment of the invention.

Embodiments of the invention enable a third party reimbursement system, such as an expense management platform, to call a mileage rate service to obtain a mileage rate for a specific driver and a specific vehicle. The mileage rate is then used by the third party reimbursement system to properly reimburse the driver for their business-related driving.

In one embodiment, the third party reimbursement system uses a mileage capture solution of its choosing and to send the mileage information back to a third party. In some embodiments, mileage capture information comprises miles driven and locations of the vehicle.

The third party reimbursement system accesses a Mileage Reimbursement as a Service to obtain individualized mileage reimbursement rates. Once rates have been determined for individuals, the Mileage Reimbursement as a Service will send the rate information back to the third party reimbursement system, which determines a mileage reimbursement amount for the driver.

Mileage capture could be performed by, for example, a GPS info directly from the car's computer, a mobile phone app communicating the phone's GPS system, or a hardware device in the car. In the described embodiments, mileage capture is information-capture agnostic. It just needs the basic mileage info. The app communicates with a vehicle's GPS (or a GPS in the operating system of a phone) and with geolocation services and sends personalized vehicle-specific information to the server. In one embodiment, server 104 receives geographical location information 112 for the specific vehicle from a database in a service 112 of geographical information, the database containing information for converting GPS data to location names.

The server determines a mileage rate (for example cents/mile) for that driver and vehicle in real time, based on the personalized vehicle-specific information and sends it to a third party or to the entity who owns the vehicle. In one embodiment, the mileage rate (cent/mile) amounts are sent back to a third party client. In one embodiment, the mileage reimbursement is determined on the server side, based on fixed and variable costs for the driver and vehicle. In other embodiments, the driver's app uses the mileage rate specific to the driver and vehicle to determine a reimbursement rate for the driver, based on fixed and variable costs for the driver and vehicle. In the described embodiment, Generally, conventional reimbursement software does not include driver-specific rates or vehicle-specific rates because of the complexity of determining such rates. As an example, multiple types of information much be kept up to date as discussed herein. Use of Mileage as a Service makes it unnecessary for third party reimbursement software to need to know driver-specific information or vehicle-specific information or to keep that information updated. Furthermore, use of Mileage as a Service make it unnecessary for third party reimbursement software to understand the various rules surrounding mileage calculation and reimbursement, or to update its software as that information changes or as the rules change. Thus, Mileage as a Service allows third party reimbursement software to concentrate on receiving and processing reimbursement requests without having to update the information or understand the complexity of individualized mileage reimbursement.

Described embodiments of the invention account for the various costs that employees incur when driving for business, updates employees' reimbursement rates based on changes in costs, and allows reimbursement software to manage the payment process. As a result, a company can provide the most accurate reimbursements to their mobile employees, without taking on the administrative burden incurred by managing all aspects of such reimbursement programs.

FIG. 1 is a block diagram showing an embodiment of the invention. In this embodiment, mileage reimbursement software (the client) 102 calls an API 180, to request a mileage rate for a specific driver ID and a specific vehicle ID from server 104. In some embodiments, a geographic location of the vehicle is also passed from client 102 to server 104. In other embodiments, server 104 can determine a geographic location of the vehicle based on the vehicle ID.

In this embodiment, this mileage capture information is provided to server 104 via a mileage capture app 106 in the driver's vehicle (or built into the vehicle itself). Other embodiments may provide mileage capture information server 104 using any appropriate mechanism. Client 102 also receives mileage capture information from app 106. In one embodiment, once a mileage rate is determined and sent to client 102, client 102 can calculate a reimbursement amount by multiplying the mileage rate from server 104 by the mileage from app 106.

The geo information 112 is used for reverse geocoding (e.g., converting absolute location data to place names, street addresses, and/or areal subdivisions such as neighbourhoods, county, state, or country), which allows, e.g., geofencing around home areas for commute deductions. It further allows detection of working locations, which enables the system to be accurate in detecting business miles.

Client 102 further requests a mileage rate for a specific driver and a specific vehicle through API 180. Server 104 determines a mileage rate (for example cents/mile) for that driver and vehicle in real time, based on personalized vehicle-specific information (and possibly driver-specific information) and makes it available to client 102. In one embodiment, server 104 receives mileage capture information 121 from app 106 in the vehicle and geo location information 112 from a geolocation service to aid in determining the mileage rate. (In another embodiment, mileage capture information is obtained by client 102, e.g., through use of an API call to the SDK in app 106. The client then send mileage information obtained from app 106 to server 104. In yet another embodiment, mileage capture information 121 from app 106 is sent to both client 102 and the server 104.)

In this embodiment, client 102 uses the mileage rate from server 104 to determine a reimbursement amount for the driver. In other embodiments, the mileage reimbursement amount is determined on the server side and passed back to calling client 102. In another embodiment, the reimbursement rate could also be made to that driver's company so that they may reimburse that driver for their mileage expenses.

A real-time determination of the reimbursement rate allows client 102 the option to pay out trip-by-trip expenses at any given time interval, rather than having to wait for a specific time period to pass. Some drivers/companies would prefer to be paid on a trip-by-trip basis, while others would prefer to do a lump sum over a given time period. Real-time determination of the reimbursement rate allows for either option.

Figure 2A:
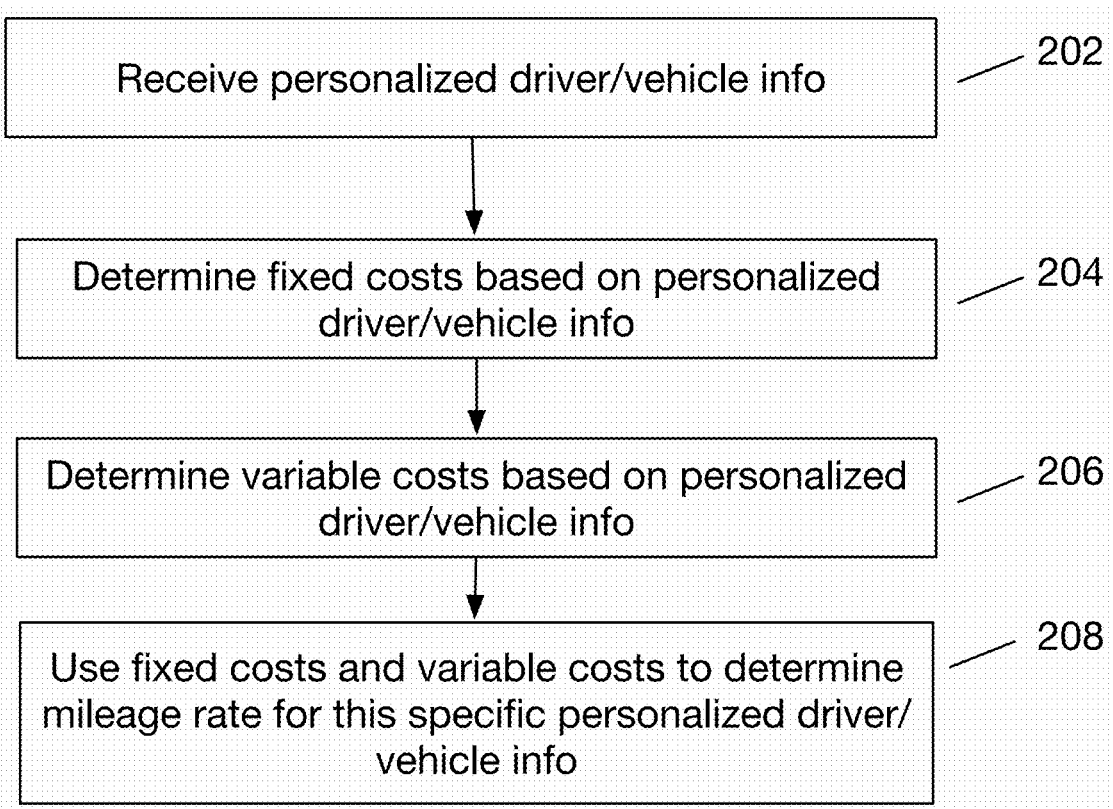
FIG. 2A is a flowchart showing a method to determine a variable rate per mile based on a specific driver, a specific vehicle, and location information for the vehicle in accordance with an embodiment of the present invention.

FIG. 2A is a flowchart showing a method performed by server 104 to determine a variable rate per mile based on a specific driver, a specific vehicle, and, optionally, location information for the vehicle in accordance with an embodiment of the present invention. As discussed above, the personalized driver/vehicle info is sent by client 102. In one embodiment, this sending is implemented as an API 180 call by server 102 to client 104. In element 202, server 104 receives personalized driver/vehicle info from the vehicle and from a memory of server 104. In one embodiment, server 104 is also monitoring 121 the miles driven and location of the vehicle in real time by communicating with the driver's mileage tracking app (or in some cases with the vehicle itself if the vehicle is able to provide such information). In some embodiments, server 104 is also communicating with geolocation services 112 to determine a location 112 of the vehicle, although some apps and/or vehicles provide geolocation information themselves.

In one embodiment, server 104 also communicates with a database 190 that contains information required to determine a mileage rate for a specific driver and vehicle. In one embodiment, database 190 stores information such as average gas prices (e.g., rate of cents/gallon), insurance rates for various vehicles and drivers, registration and fees for various vehicles and drivers, vehicle depreciation information for various vehicles, and vehicle maintenance costs for various vehicles. Note that some of the information stored in database 190 is specific to a specific driver (for example, insurance rates), some is specific to a specific vehicle (for example, actual MPG), and some are specific to a specific make or model of vehicle (for example, base MPG). In one embodiment, some or all of the data in database 190 is updated periodically. For example, base MPG may be updated periodically as new base MPG information come out for specific make and models of vehicle. As a further example, individual insurance rates for a specific driver may be updated as the driver's rate changes. In one embodiment, server 104 periodically checks an external source to determine whether any information in database 190 needs to be updated In element 204, server 104 determines a fixed cost based on the personalized driver/vehicle info, as described below.

In element 206, server 104 determines variable costs based on the personalized driver/vehicle info, as described below.

In element 208 server 104 uses the fixed cost and variable cost to determine a mileage reimbursement rate for this specific personalized driver/vehicle info. In one embodiment, a client such as client 102 requests the mileage reimbursement rate from server 104. In one embodiment the fixed and variable costs are reported separately to client 102 and together, constitute an individualized "mileage rate."

Figure 2D:
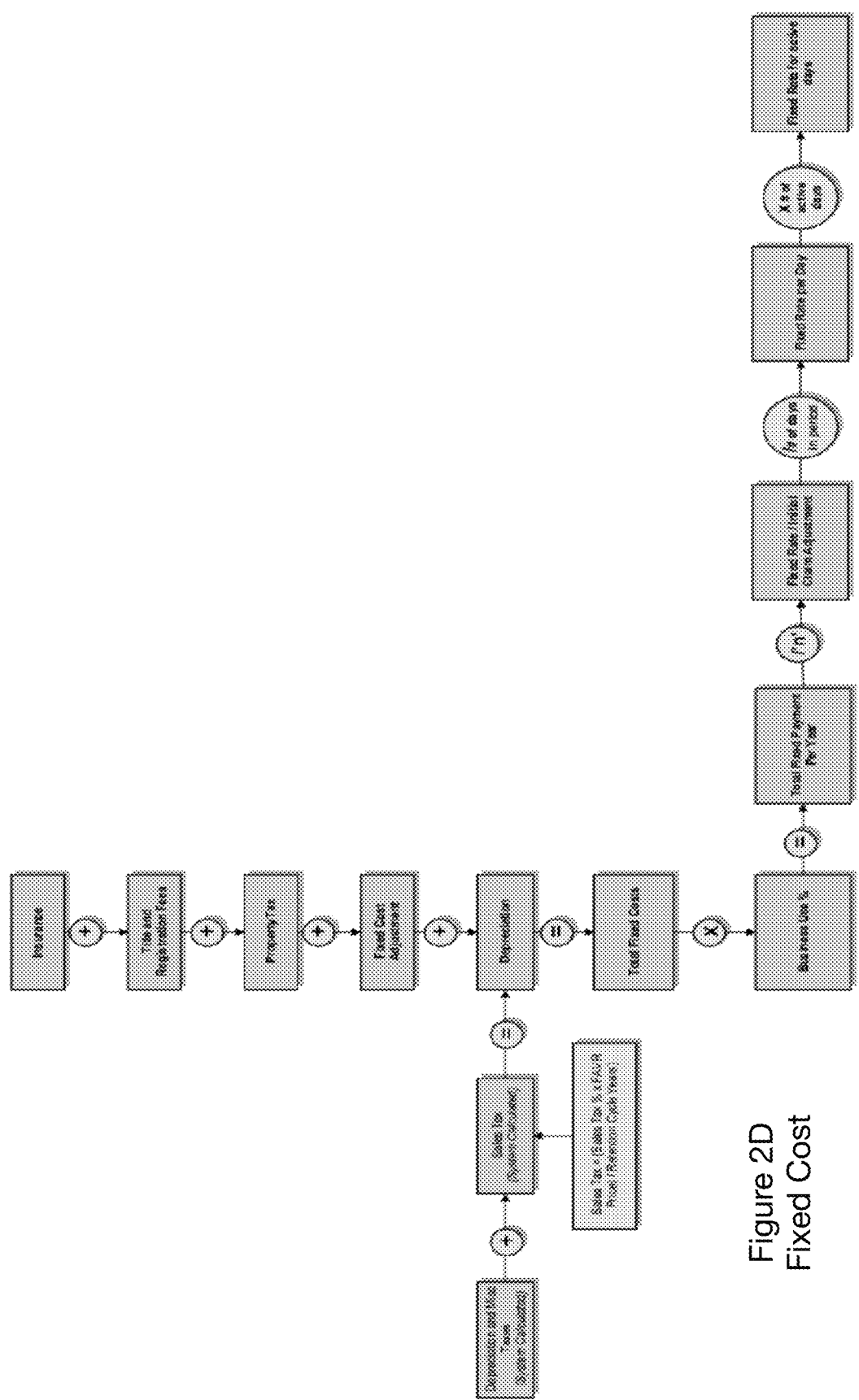
FIG. 2D is a flowchart showing an example of a method used to determine fixed costs in accordance with an embodiment of the present invention.
Figure 2F:
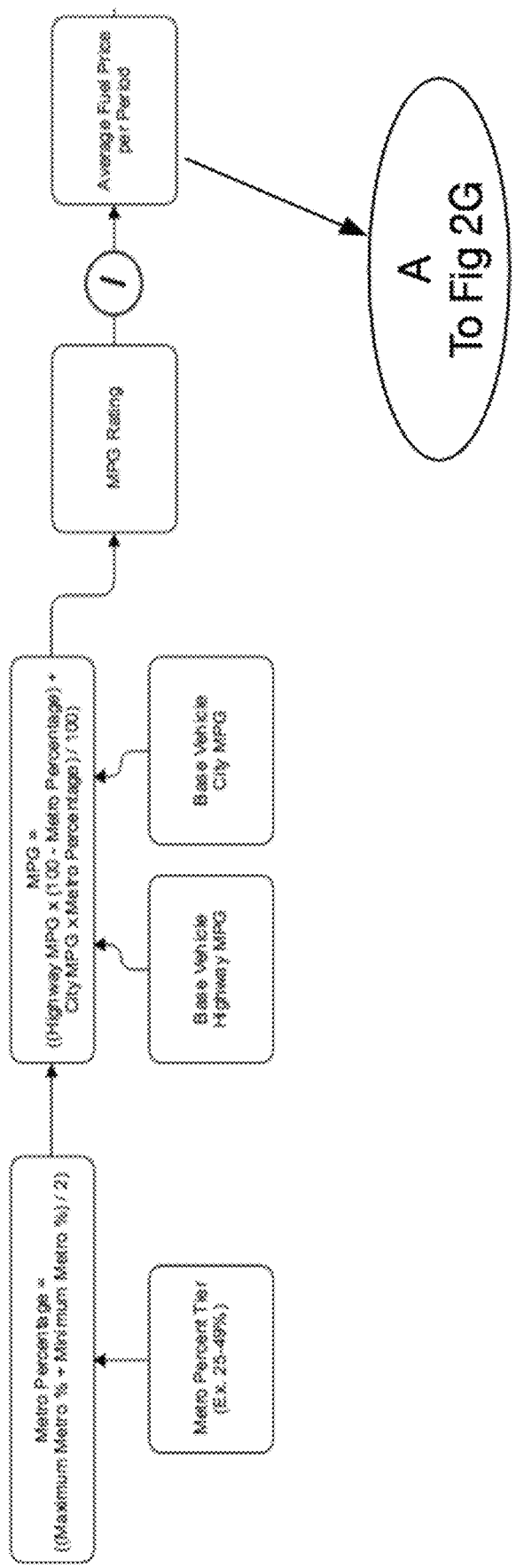
FIGS. 2F and 2G are flowcharts showing an example of a method used to determine variable costs in accordance with an embodiment of the present invention.

FIG. 2B is a diagram of a data structure in a memory of server 104 showing information used in the embodiment of FIGS. 2D and 2F/2G. This data structure is stored in a memory of server 104 (for example, database 190), although the information may be initially obtained from sources outside server 104. The information includes information such as address, vehicle make, model, and year, and vehicle retail price which, in one embodiment, are provided by the driver. If the company already has the driver's address, vehicle, make, model, year, and retail price, this information can also be provided by the company. The information further includes a group vehicle type (e.g., "group vehicle type=delivery vehicle") that, in one embodiment, is provided by the company. Other examples of vehicle type might be "executive car, sales vehicle, VIN number, etc.

In this embodiment, address, vehicle, make/model/year and vehicle retail price are provided by the driver. In this embodiment, the group vehicle type is provided by the company that owns the vehicle or contracts with the driver.

FIG. 2C is a diagram of a data structure in a memory of server 104 showing information used in the embodiment of FIG. 2D. This data structure is stored in a memory of server 104 (for example, database 190), although some of the information is initially obtained from sources outside server 104. The information includes information such as Business Use %, Depreciation, and Fixed Cost Adjustment which, in one embodiment, are provided by the driver. The information includes information such as Insurance Cost, Property Tax, Registration Fee(s), Sales tax, and Title Fee(s) which, in one embodiment, are provided by the company that controls server 104 and/or provides Mileage as a Service or from known third party sources.

FIG. 2D is a flowchart showing an example of a method to determine fixed costs used in accordance with an embodiment of the present invention. In one embodiment, fixed cost is determined by adding insurance cost, title and registration fees, property tax, fixed cost adjustment, and depreciation to yield Total Fixed Costs.

Depreciation is determined by adding Depreciation and Misc. Taxes (system calculated) and Sales Tax (system calculated). For example, in one embodiment, Sales Tax may be: (Sales Tax %×FAVR Price/Retention Cycle Years). FAVR refers to the IRS "Fixed and Variable Rate Allowance," as described in Internal Revenue Bulletin: 2010-51, Dec. 20, 2010, which is incorporated by reference herein. FAVR is an IRS revenue procedure that can be used to reimburse mobile employees tax-free for both the fixed and variable costs associated with driving for business. In one embodiment, the mileage rate is determined in accordance with the FAVR, although any appropriate mileage rate may be determined as a service for the client so that client 102 does not need to be concerned with exactly how the rate is obtained.

As an example, differing geographical locations such as different states or counties may have somewhat different rules about employee reimbursement. In such a situation, server 106 would take into account the geographical location associated with the driver (such as where the driver resided) and figure an appropriate mileage rate for that driver and vehicle. As another example, server 104 implementations in countries other than the United States could use whatever mileage rate determination method is appropriate for a particular country. For example, some European countries use a mileage reimbursement method in which reimbursement is based at least in part on engine size, so in such embodiments, server 106 would need to know the engine size for various vehicle. As another example, some countries reimburse employers and/or employees for bike commuting. An embodiment of the present system could detect bike miles instead of car miles and provide a mileage rate for bike miles ridden so that companies/employees could be properly reimbursed for reimbursable bike miles ridden.

In another embodiment, server 106 takes into account a location of the miles driven and/or a residence of the driver and uses a method appropriate for that geographic location. This would be useful for a company reimbursing employees based in multiple countries or based in geographical locations with differing rules about mileage reimbursement. Mileage as a Service server 104 would receive a request from a client 102, then determine and send an appropriate mileage rate to the requesting client using whichever reimbursement In one embodiment, client 102 also sends a geographic location associated with the driver to server 104. Examples of how geographic location is used are described below. Both fixed and variable costs can vary greatly depending on an employee's location. For example, yearly vehicle property taxes are not the same in every state. In Virginia, for example, property taxes average $962, while they average just $85 in Montana. That's an $877 difference per year, and if you consider other vehicle costs, the impact of geographic variances can be quite substantial. Similarly, insurance premiums vary widely, from as much as $2,476 in Michigan to $805 in Maine (a $1,671 difference). Registration fees also differ by state, costing just $14 in Mississippi yet $101 in Illinois. Add on fuel prices, which vary not only by state, but also by day, and these differences in cost can become an administrative nightmare for companies with a widely-dispersed mobile workforce to track.

In the described embodiment, Total Fixed Costs are multiplied by Business Use % to yield Total Fixed Payment per Year, which is divided by n (e.g., 12 months) to yield a Fixed Rate/Initial Claim Adjustment, which is divided by the number of days in the current time period (e.g., days in the current month if the rate is being requested for the current month) to yield a fixed rate per day. The Fixed Rate per Day is multiplied by the number of active days in the current time period (e.g., the current month) to yield a Fixed Rate for active days.

As mentioned above, in one embodiment, various ones of these fixed costs will depend on server 104 knowing either the vehicle's make and model and/or on knowing the driver's identify. For example:

| Cost | Dependent on Knowing: |
|---|---|
| Insurance | Vehicle Info, driver info |
| Title and Registration Fees | Vehicle Info, driver info |
| Property Tax | Vehicle Info, driver info |
| Fixed Cost Adjustment | Vehicle Info, driver info |
| Depreciation | Vehicle Info, driver info |
| Business Use % | Driver Info (or determined from mileage capture) |

Therefore, the Fixed Rate for Active Days is determined by server 104 based at least in part on knowing the driver's identity and the vehicle ID. In one embodiment, the vehicle ID includes the make and model of the vehicle. In some embodiments, the vehicle info and driver info are used to look up the fixed costs for a specific driver and specific vehicle.

Figure 2G:
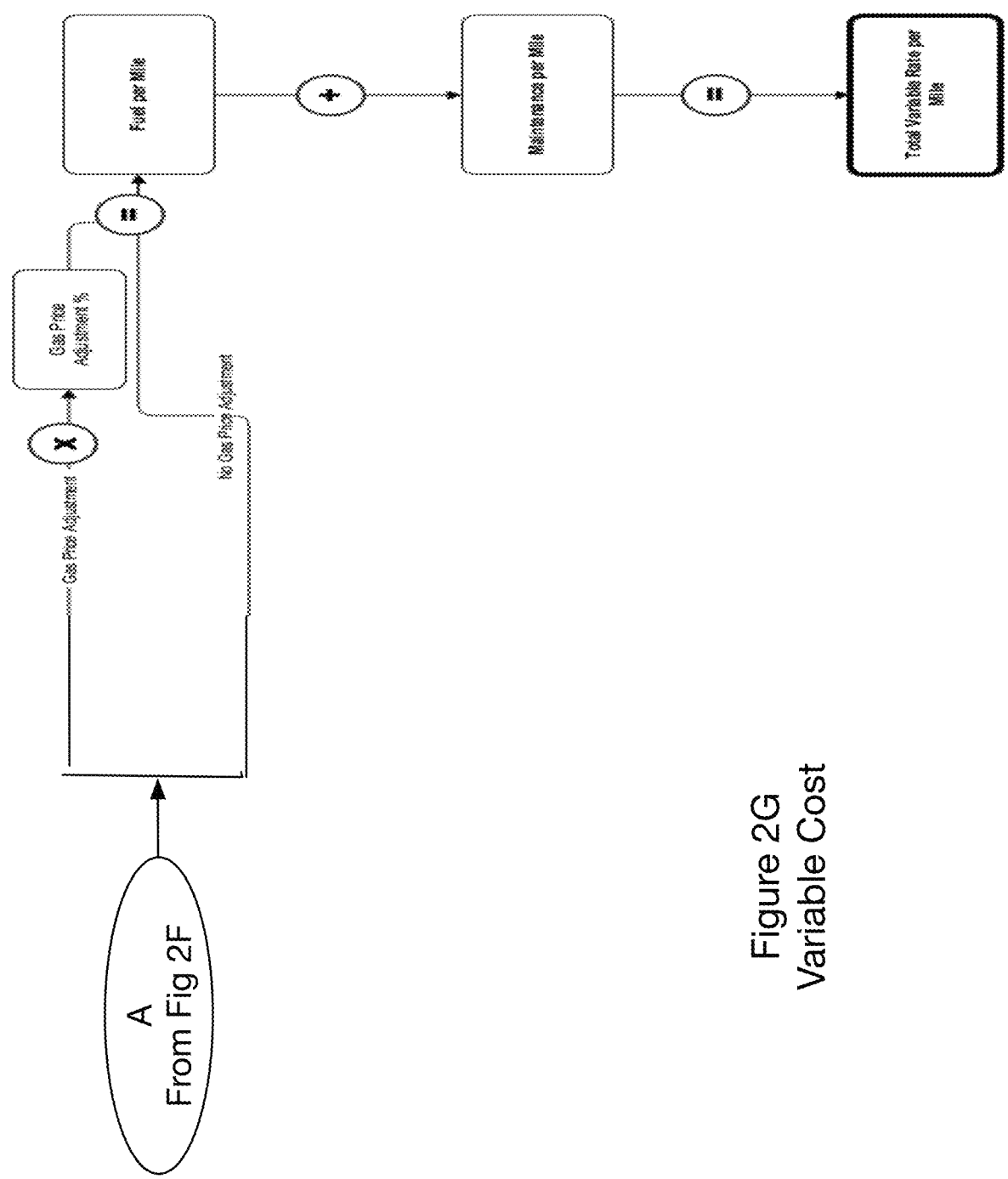

FIG. 2E is a diagram of a data structure in a memory of a server 104 (for example, database 190) showing information used in the embodiment of FIGS. 2F and 2G. This data structure is stored in a memory of server 104, although some of the information is obtained from sources outside server 104. The information includes information such as actual vehicle MPG (Highway) and actual vehicle MPG (City) which, in one embodiment, are provided by the driver. One embodiment alternately uses an MPG value from manufacturer information (estimated MPG). Other embodiments alternately get MPG info directly from the car's computer for even greater accuracy. The information also includes a metro %, which is the percentage of miles driven in a metro area versus a non-metro area, which is provided by the driver. The information includes information such as gas price per gallon which, in one embodiment, are provided by an external service. The information includes information such as maintenance/tires/repairs per mile, which as provided by an external service and can be looked up for the specific make/model/year of the vehicle. Alternately, metro % can be determined as shown in FIG. 2F.

FIGS. 2F and 2G are flowcharts showing an example of a method to determine variable costs used in accordance with an embodiment of the present invention.

In FIG. 2F, Metro Percentage (also called Metro %) is determined from the miles driven and vehicle locations as reported by the app 106 in the vehicle (or in some embodiments by the vehicle itself). In some alternate embodiments, the driver specifies the metro percentage for the vehicle if actual vehicle information is not available.

$$\text{Metro \%} = ((\text{Maximum Metro \%} + \text{Minimum Metro \%})/2)$$

Thus, in the example of FIG. 2F, Metro % is ((25+49)/2)=37% for the specific vehicle. Metro % is used to calculate MPG as described below.

Initially, server 104 looks at a metro percent tier predefined for the vehicle. Metro percent tier specifies which of a tier of percentage ranges describes the metro-based driving of the specific vehicle. In the described embodiment, metro % for a vehicle plus highway % for the vehicle equals 100%. Other embodiments may have other categories so that all driving type categories add up to 100%. Note that server 104 knows the metro percentage tiers generally (or knows the metro percentage for the specific vehicle/driver, in which case metro percentage does not need to be calculated). In one embodiment, the metro percentage tiers are updated on a periodic basis. For example, the metro percentage tiers for a specific vehicle might change as the driver's job changes and they drive fewer or more metro miles. This is an example of why mileage as a service is preferable to conventional reimbursement systems since a conventional system does not typically update data relating to mileage.

In the described embodiment, Miles per Gallon (MPG) is determined by:

$$\text{MPG} = ((\text{Vehicle MPG Hwy} * (100 - \text{Metro \%})) + (\text{Vehicle MPG City} * \text{Metro \%})/100)$$

Note that server 104 knows the base highway MPG and base metro MPG for the specific vehicle. In one embodiment, the highway and metro MPG are updated on a periodic basis. For example, as a vehicle ages, the MPG for the car may change and may need to be updated. This is an example of why mileage as a service is preferable to conventional reimbursement systems since a conventional system does not typically update data relating to base MPG.

The average cost of fuel for the period is determined by dividing the MPG for the specific vehicle and time period by the average fuel price for the period. Note that server 104 knows the average fuel price. In one embodiment, average fuel price is updated on a periodic basis. For example, as fuel prices fluctuate, the average fuel price for a particular type of fuel used by the specific vehicle may change and may need to be updated. This is an example of why mileage as a service is preferable to conventional reimbursement systems since a conventional system does not typically update average fuel prices.

$$\text{Average cost of fuel} = \text{MPG}/\text{average fuel price for the period}$$

FIG. 2G continues the method of FIG. 2F. In FIG. 2G, if there is a gas price adjustment to be factored in for the specific driver/vehicle, the gas price adjustment is factored into the average cost of fuel. Otherwise, the average cost of fuel per mile from FIG. 2F is used. The average cost of fuel per mile (for the period) is added to the maintenance cost (for the period) to yield a total variable rate per mile for the specific vehicle and driver for the period. For example, the total variable rate per mile may be expressed in cents per mile.

As discussed above in connection with FIG. 2A, the fixed rate for active days (from FIG. 2D) is added to the cost of fuel per mile (from FIG. 2F) to yield a mileage reimbursement rate for the specific vehicle and driver.

As described above, in FIG. 2F, the Vehicle MPG Hwy and Vehicle MPG City values are specific to the specific vehicle and are received from the driver, from the app located in the vehicle (or the vehicle itself). A base MPG for the type of vehicle is stored in database 190.

In the described embodiment, Variable Cost per Mile is determined by:

$$\text{Maintenance/Tires/Repairs per mile} + (\text{Gas Price per gallon}/\text{Miles per gallon})$$

MPG is divided by the average fuel price per period. Some embodiments use a fixed period, such as every two weeks if, for example, their drivers are reimbursed every two weeks. Other embodiments allow client 102 to specify the reimbursement period in the request for mileage reimbursement rate. Other embodiments determine a reimbursement rate per trip. and MPG is optionally adjusted by a gas price adjustment value to yield Fuel per Mile. In one embodiment, whether MPG is adjusted is predetermined by the company owning the vehicles or by the drivers of the vehicles. Fuel per Mile is added to Maintenance per Mile to yield a Total Variable Rate per Mile. Maintenance per mile is variable and calculated on how many miles the vehicle is driven.

In one embodiment, the call and received information from software/hardware 102 to the API 180 is formatted as follows, although it will be understood that other variations on this format may be used.

Inputs: Vehicle Info, Driver Info (optional: geographic information about driver and/or vehicle)

Output: Fixed Rate and Variable Rate (these together form is the "mileage rate" in one embodiment)

As an example, in other embodiments, inputs could include a time period for which a reimbursement rate is to be determined (if the time period is not fixed). In still other embodiments, trip information may already be known to server 104 for a specific driver and period, so would not need to be included as an input.

General System Background

The following paragraphs describe mileage tracking activity and driving activity tracking in an embodiment of the invention. It will be understood that other embodiments may use track mileage somewhat differently and/or may track somewhat different, fewer, or more types of driving activity. The solution described here provides a software development kit ("SDK") (or an "API") for mobile app developers to provide Mileage Capture and Mileage Reimbursement solutions to users or to third party providers who provide a solution to users. Embedding this functionality will provide end users with the ability to capture mileage using GPS capabilities of their mobile devices.

The Mileage Capture SDK allows mobile app developers to create a Mileage Capture solution and make it available to their user base. For example, a driver may have a mobile device with a GPS function. As another example, the device may have a GPS device built in (such a capability built into a vehicle is herein also termed a "mobile device" for ease of explanation and clarity of discussion). The SDK is a GPS-breadcrumb, actual-mileage trip capture solution that uses the vehicle's location and movement to determine trips made with several features:

Automated, non user-interference based mileage capture mode with optional manual mode support Seamless integration with host expense management app Offers best-in-class mileage capture solution without heavy development or integration effort The majority of business trips today are taken using personally-owned vehicles. These drivers have needs unique from those of truckers or business travelers who fly for work, making it even more challenging for businesses or individuals to track mileage and administer fair and accurate vehicle programs. Embodiments of the invention make mileage tracking and vehicle management software available to third parties to empower software providers to meet their customers' basic vehicle program-related needs, without incurring development risks or diverting meaningful resources.

Software solution providers across a wide range of applications will now be able to leverage the SDK to streamline mileage tracking and basic reimbursement tasks for their clients, while ensuring vehicle program cost-efficiency and compliance. Human resource information systems (HRIS) and human resource management systems (HRMS) software providers can now track and validate insurance and policies, as well as capture medical-related personal mileage for reimbursement. Ride-hailing services can embed the technology to meet the "off-hour" tracking and reporting needs of their drivers, better separating personal mileage from business mileage. Travel and expense management (T&E) solutions can streamline and improve the accuracy of mileage tracking and the end-to-end reimbursement process for employees; while pairing the technology with accounting/audit software extends the same benefits to independent contractors. On-demand delivery providers can provide real-time asset monitoring and tracking, while ensuring a comprehensive and compliant mileage reimbursement solution. The technology can also be embedded within customer relationship management (CRM) systems, route planning apps, fleet management software, and more.

The cloud-based, mobile enterprise platform makes mileage tracking more precise and streamlines manual tasks associated with maintaining IRS compliance. For employers, the platform makes mileage-related expense reporting, processing and compliance more efficient. Companies that have employees that drive more than 3K miles per year can seamlessly integrate the technology for more robust reimbursement solutions for ensuring fairness, accuracy, and compliance. The reimbursement solutions utilize the company's business rules engine, which considers more than 150 different variables, informing more than 300 settings, to calculate an accurate, individualized reimbursement rate based on where a driver lives and the number of miles they drive. For high-mileage drivers, the information specificity and velocity of the rules engine is critical to ensuring accuracy and compliance; typically driving cost savings of $2,000-$3,000 per driver, per year. With the SDK, third party software providers can now leverage mileage tracking and reimbursement capabilities to meet clients' basic mileage tracking needs, while providing a seamless path to utilize the business rules engine to calculate accurate reimbursements for higher mileage employees.

By seamlessly integrating mileage tracking and vehicle management features into their existing software offerings, software providers can deliver actionable cost and field-level efficiency information to employers and ensure that employee reimbursements are fair, accurate, and compliant.

An embodiment of the invention makes at least the following functionality available to calling apps/programs. These programs can be developed by the maker of the functions or by third party developers who supply a third party program to end users.

Figure 3A:
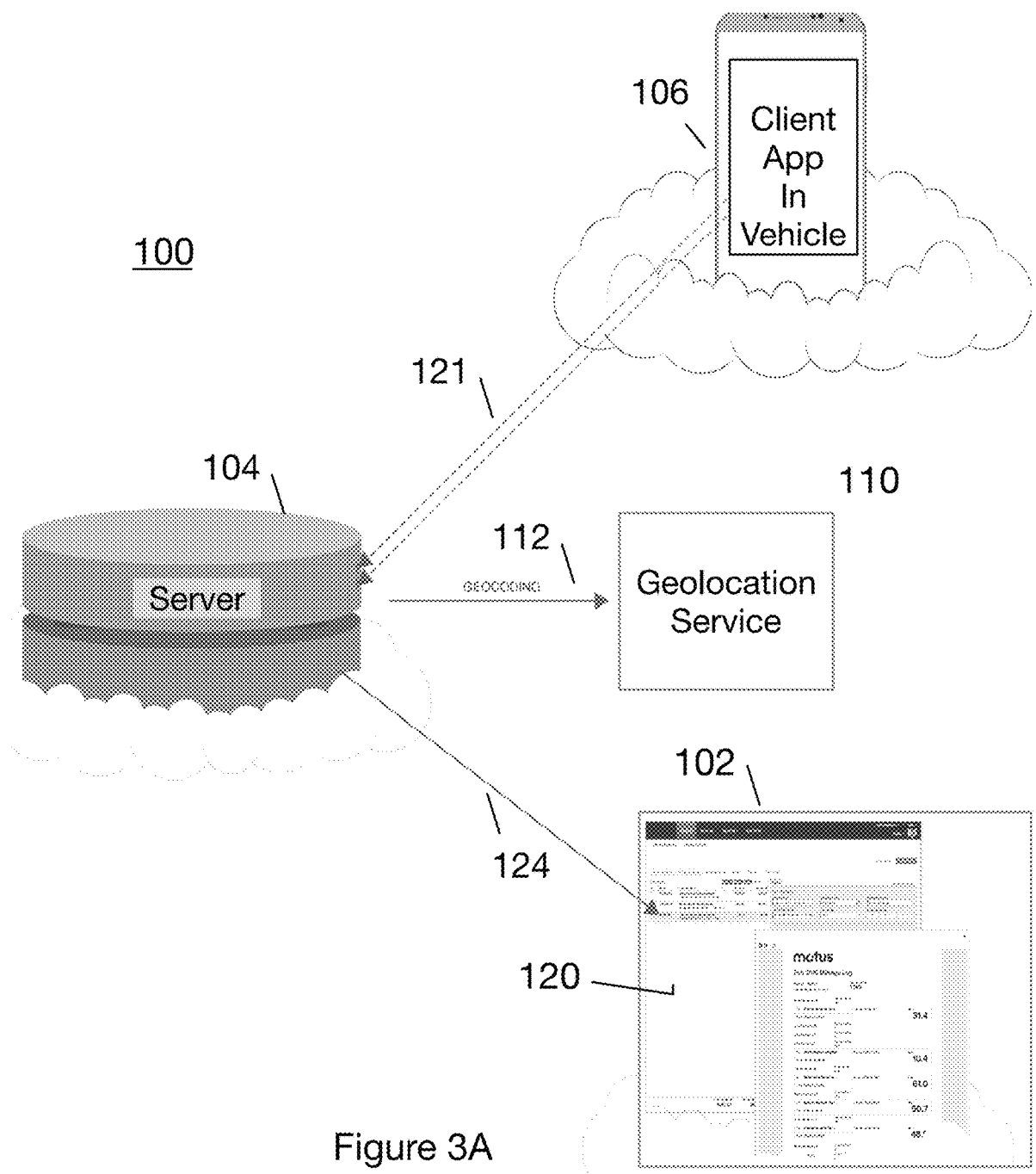
FIG. 3A is a block diagram showing an embodiment of the invention.

FIG. 3A is a block diagram showing an embodiment of the invention. In one embodiment, client app 106 on a mobile device 102 communicates with an SDK 104 on the mobile device as described below to implement mileage information functionality for client app 106.

In one embodiment, the app and SDK reside on a user's mobile device and are able to obtain location information for a vehicle when the user takes the mobile device, which includes GPS functionality, with them in the vehicle. In one embodiment, the app and SDK reside on a user's mobile phone and are able to obtain location information from the device. In another embodiment, as shown by dotted lines in FIG. 3A, certain functionality such as reverse geo-location based on geocoding information 112 using geo services 110 and/or map creation is performed by a server 104 that communicates with the SDK (or with the app directly). In other embodiments, a GPS function is built into the vehicle and may be accessed by the phone app or directly.

FIG. 3A also shows reports 120, which are stored on server 100 and accessed by a user via a browser or an app. Alternately, the SDK may backup location and trip information to server 100, which generates reports 120 from the information.

Figure 3B:
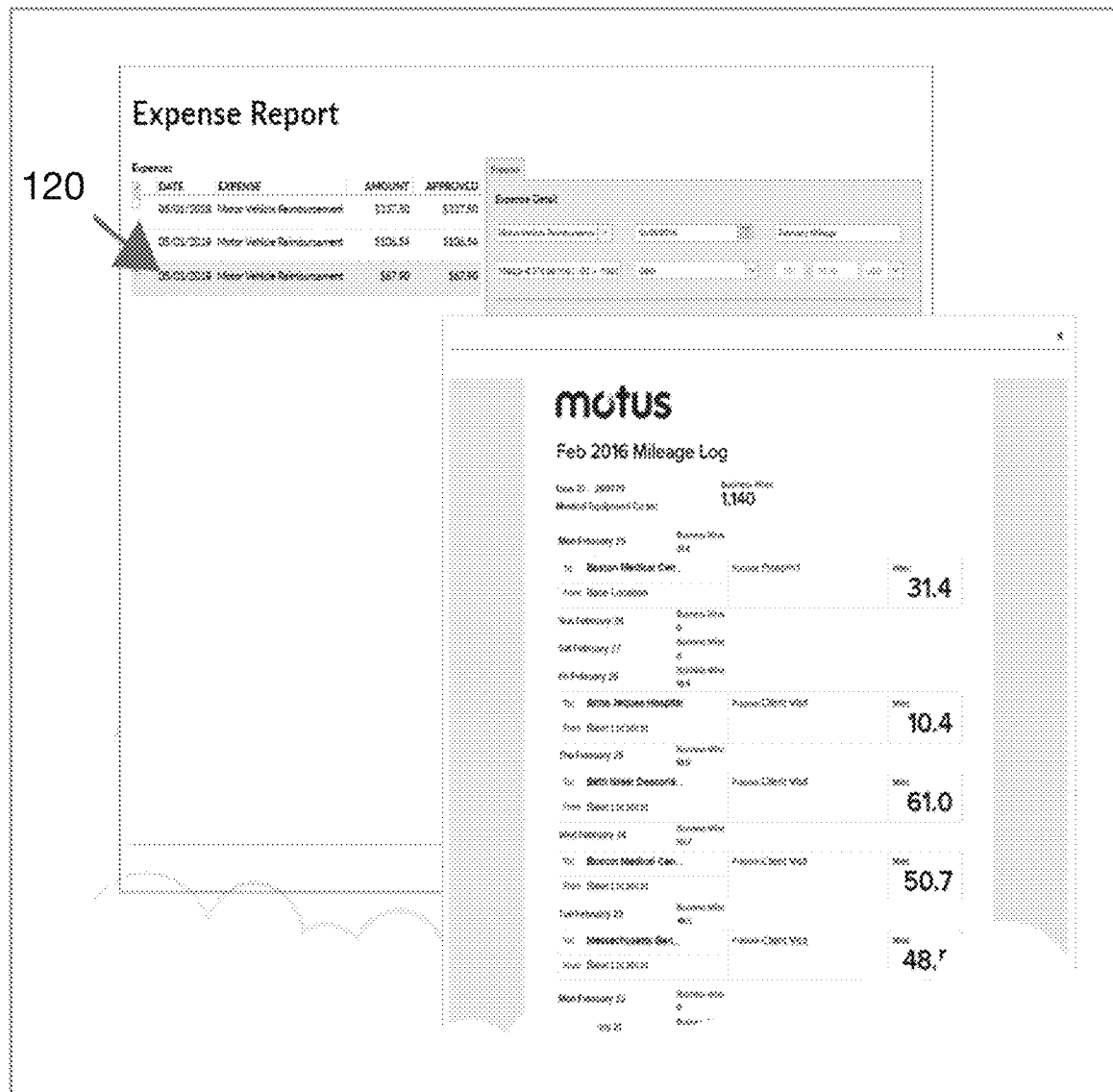
FIG. 3B is an example of information stored in a memory (or in the cloud) in accordance with an embodiment of the invention.

FIG. 3B is an example of information stored in a memory (or in the cloud) 120 in accordance with an embodiment of the invention for user 122. As mentioned, these reports are stored on server 104 and viewed as web-based or app based reports. In one embodiment, the reports are generated by reimbursement client 102 of FIG. 1. This Figure shows an example of how the mileage rate is used to generate reports relating to employee reimbursement. Alternately, the information can be stored on server 120 and used to generate reports viewable on mobile device 102. A first report shows columns for: date, expense type, amount, requested reimbursement amount, and trip details. A second report shows a mileage log for user 122, including: user ID, company name, total number of miles, and mileage details for each to/from pairing for a series of dates.

In general, the following information is passed between the app and the SDK:
i. Information that gets passed from app (client):
 1. GPS points of trip (from which start and stop points are extrapolated)
 2. Trip start time
 3. Trip end time
 4. User ID
 5. Distance of trip
 6. Commute mileage (if applicable)
ii. Information that gets passed from SDK back to app (client)
 1. List of trips
 2. Encoded route polyline Functions Actual Route Trip Capture Summary Ability of the SDK solution to track the actual route taken by the driver using frequent GPS pings Description Actual route tracking is considered to be the industry standard as it relates to mileage tracking. The SDK supports actual mile tracking based on frequent GPS pings. If GPS signal drops due to unforeseen circumstances for more than a certain distance threshold the solution will resort to 'optimal' mileage, which is the ability to connect a start-end location using a mapping provider's determination of optimal route between those 2 points. Gaps in signal under this threshold will be filled in using straight line. The solution uses the most effective balance between battery conservation and GPS pings to yield accurate trip capture.

Trip Meta-Data Capture

Summary

The SDK captures all trip data when app is either in Auto Tracking or Manual Tracking mode.

Description

Trips are tracked as a driver's contiguous route segments partitioned by detected stops. Stops are identified based on either manual input from the user, or through remaining stationary at a specific location for a configurable amount of time. Default amount of time is five minutes. Start and Stop locations are reverse-geocoded using a mapping provider to translate Lat./Long data points to user friendly addresses (see Reverse-Geocoding section below for more details). Trip start and trip end times are both data points captured and associated with a specific trip. Trip and stop durations may be calculated using the start and end timestamps of the trips. Each trip, constituted by a Start and End location with Distance and Time is available as a discrete data packet for usage such as mileage expense. Alternatively, trips may be grouped together as part of a "trip list" for bundling a series of trips as a single expense. For example, one expense could be created for an entire day's worth of trips. If a valid address is not detected at the location of the Stop, then the closest valid address will be reverse-geocoded to that stop.

Automatic Mileage Capture with Business Hours

Summary

The SDK supports user level configuration of daily business hours thereby enabling automatic mileage capture during business hours.

Description

Set single contiguous business hours for each weekday. Once set, business hours are saved as user preference. Ability to modify business hours at any time. SDK will automatically start tracking the driver when trips are made during business hours. User has the ability to manually mark a stop while in Business Hours by pressing a "Stop Tracking" button.

Manual Mileage Capture

Summary

In manual mileage tracking mode, the user has the ability to Start and Stop a trip manually.

Description

Manual tracking mode available by default, implying that a user has to start tracking by clicking a Start button. Once tracking has been initiated, stops made by the driver are automatically detected by the stop/start algorithm. User can manually stop an ongoing trip, which will end the trip in progress, mark the current location as a stop and end tracking until re-initiated. A potential UI implementation is a Start/Stop button that can toggle based on the state of the trip (e.g. user would be presented with the Stop button when a trip is in progress and vice versa)

Commute Deduction Support

Summary

Allow users to deduct commute related trips from their reimbursable trip sets.

Description

Offer an effective, simplified commute deduction solution that allows users to deduct commute related personal expenses from trips.

Reverse-Geocoding Addresses

Summary

The SDK is able to reverse-geocode Latitude/Longitude coordinates for a user's stop to return a valid, readable address.

Description

For any detected Start and Stop points the address is geocoded to a valid readable address. All geocoded addresses are detected at or in the close proximity of the Stop.

Stop Arrival Push Notification

Summary

The SDK supports local push notifications reminding the user to add metadata as required on arrival at a Stop.

Description

In automatic tracking mode when a stop is detected the app notifies the user that a stop has been registered. The intended effect being to prompt user to enter in any details for that trip/expense. Notifications will arrive once a stop has been detected, meaning that the user has been stationary at the location for the configurable amount of time.

Purpose Field Input Support for Stop

Summary

The SDK supports the ability for user to enter metadata related to a Stop in form of a Purpose field.

Description

A common use case for drivers is to add the Purpose of a specific visit or a CRM-related note to a Stop so that contextual information related to the Stop may be retrieved and analyzed at a future date. This is an optional feature and may be used at the discretion of the developer. A common use case for the local notification ability described in the previous section is to remind the user to enter in info into this purpose field. The Purpose field can be stored with a specific trip and may be utilized for other fields in an expense management system such as "Comments" for example Route Map (polyline) Support Summary After a trip is saved by the SDK, the server returns an encoded polyline for each trip within the trip list. This polyline can be decoded to display a set of lat/long points on a map UI, if desired.

Description

Polylines can be decoded onto a map tile UI to show a visual route of a driven trip.

Figure 4:
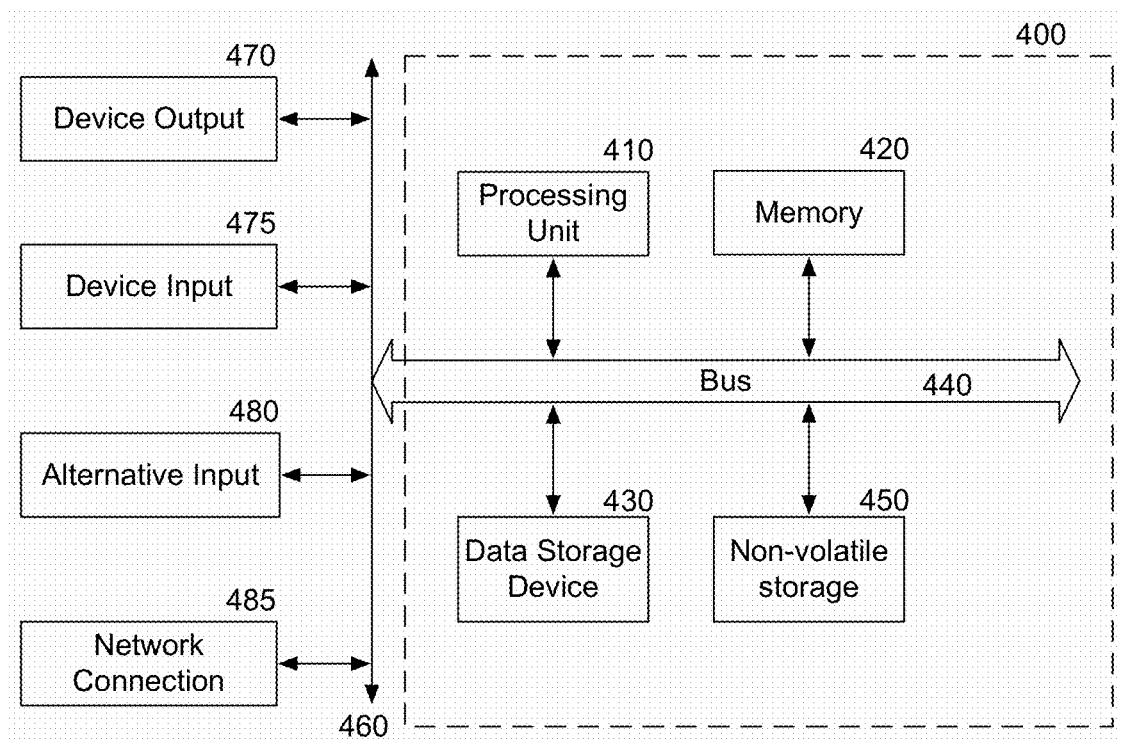
FIG. 4 is an example of an information processing system that can be used to implement an embodiment of the invention.

FIG. 4 is a block diagram of one embodiment of a data processing system that may be used with embodiments in accordance with the present invention. For example, in one embodiment, the data processing system might be a mobile device executing a mobile app that tracks vehicle mileage as described herein. In one embodiment, the data processing system may be a data processing system communicatively coupled to a geolocation sensor, such as a GPS system in a mobile phone, vehicle or similar conveyance. Thus, the SDK (or app in some embodiment) of the data processing system can communicate with the sensor to determine a plurality of locations of the vehicle or conveyance and use the location information and other information received from the vehicle to determine trip information of the vehicle. The data processing system may also include a memory or database associating the vehicle with an entity, for example, an employee. Thus, the data processor can associate the vehicle and the determined trip data (along with other data received and derived for the vehicle) with the entity.

In one embodiment, the data processing system performs at least the following functionality as described here:

Actual Route trip capture,
Trip meta-data capture,
Automatic mileage capture with business hours,
Manual mileage capture,
Commute deduction support,
Reverse-geocoding addresses,
Stop arrival push notification,
Purpose field input support for Stop, and
Route map (polyline) support in the form of a map or a link to a map that can be incorporated into reports, documents etc. by the data processing system.

It will be apparent to those of ordinary skill in the art, however that other alternative systems of various system architectures than those shown in FIG. 4 may also be used.

The data processing system illustrated in FIG. 4 includes a bus or other internal communication means 440 for communicating information, and a processing unit 410 coupled to the bus 440 for processing information. The processing unit 410 may be a central processing unit (CPU), a digital signal processor (DSP), or another type of processing unit 410.

The system further includes, in one embodiment, an SRAM or other volatile storage device 420 (referred to as memory), coupled to bus 440 for storing information and instructions to be executed by processor 410. In an embodiment, one example of information stored is trip information, including start and end points of multiple trips made by a user's vehicle and geolocation information for the trips. Some embodiments may also store reverse geolocation information derived from the trip information. In one embodiment, the data processing system calls geolocation services to obtain reverse geolocation information. In other embodiments, the data processing system generates the reverse geolocation information on its own using its own geo database. Main memory 420 may also be used for storing temporary variables or other intermediate information during execution of instructions by processing unit 410.

The system also comprises in one embodiment a read only memory (ROM) 450 and/or static storage device 450 coupled to bus 440 for storing static information and instructions for processor 410. In one embodiment, the system also includes a data storage device 430 such as a magnetic disk or optical disk and its corresponding disk drive, or Flash memory or other storage which is capable of storing data when no power is supplied to the system. Data storage device 430 in one embodiment is coupled to bus 440 for storing information and instructions.

The system may further be coupled to an output device 470, such as a cathode ray tube (CRT) or a liquid crystal display (LCD) coupled to bus 440 through bus 460 for outputting information. The output device 470 may be a visual output device, an audio output device, and/or tactile output device (e.g. vibrations, etc.)

An input device 475 may be coupled to the bus 460. The input device 475 may be an alphanumeric input device, such as a keyboard including alphanumeric and other keys, for enabling a user to communicate information and command selections to processing unit 410. An additional user input device 480 may further be included. One such user input device 480 is cursor control device 480, such as a mouse, a trackball, stylus, cursor direction keys, or touch screen, may be coupled to bus 440 through bus 460 for communicating direction information and command selections to processing unit 410, and for controlling movement on display device 470.

Another device, which may optionally be coupled to data processing system 400, is a network device 485 for accessing other nodes of a distributed system via a network. The communication device 485 may include any of a number of commercially available networking peripheral devices such as those used for coupling to an Ethernet, token ring, Internet, or wide area network, personal area network, wireless network or other method of accessing other devices. The communication device 485 may further be a null-modem connection, or any other mechanism that provides connectivity between the data processing system 400 and the outside world.

Note that any or all of the components of this system illustrated in FIG. 4 and associated hardware may be used in various embodiments of the present invention.

It will be appreciated by those of ordinary skill in the art that the specific machine that embodies the present invention may be configured in various ways according to the specific implementation. The control logic or software implementing the present invention can be stored in main memory 420, mass storage device 430, or other storage medium locally or remotely accessible to processor 410.

It will be apparent to those of ordinary skill in the art that the system, method, and process described herein can be implemented as software stored in main memory 420 or read only memory 450 and executed by processor 410. This control logic or software may also be resident on an article of manufacture comprising a computer readable medium having computer readable program code embodied therein and being readable by the mass storage device 430 and for causing the processor 410 to operate in accordance with the methods and teachings herein.

The present invention may also be embodied in a handheld or portable device containing a subset of the computer hardware components described above. For example, the handheld device may be configured to contain only the bus 440, the processor 410, and memory 450 and/or 420.

The handheld device may be configured to include a set of buttons or input signaling components with which a user may select from a set of available options. These could be considered input device #1 475 or input device #2 480. The handheld device may also be configured to include an output device 470 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein. The present invention may also be embodied in a special purpose appliance including a subset of the computer hardware components described above, such as a kiosk or a vehicle. For example, the appliance may include a processing unit 410, a data storage device 430, a bus 440, and memory 420, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 485. It will be appreciated by those of ordinary skill in the art that any configuration of the specific machine implemented as the data processing system may be used according to the specific implementation. The control logic or software implementing the present invention can be stored on any machine-readable medium locally or remotely accessible to processor 410. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.). In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The following paragraphs describe usage of an SDK in accordance with an embodiment of the invention:

Example Embodiment of the SDK

MotusSDK provides access to some of the core functionalities of the Motus iOS application, those include mileage tracking with the phone GPS and trips storage on the Motus servers, SDK is distributed in a .framework file which is ready to be imported into host applications that wish to incorporate that kind of functionality into them. Note that the SDK for determining individualized mileage rate is described above.

SDK Usage

Configure your AppDelegate

Your application will need to do a few things to have Motus work correctly, please follow these instructions to have your 'AppDelegate' all set to use Motus SDK:

Import MotusSDK at the top of your AppDelegate

"'swift import MotusSDK

'"

Add an instance of the MotusSDK object to your AppDelegate

"'swift var motus: MotusSDK=MotusSDK.withCredentials(" [appId]", secret: "[motus provided secret]")

'"

Initialize it in your 'func application(application: UIApplication, didFinishLaunchingWithOptions . . . ' method "'swift self.motus.setup(username: "FINAL_USER_USERNAME", groupId: "[PROVIDED_GROUP_ID]")

'"

Inside your 'func applicationWillResignActive(application: UIApplication) {' add the following:

"'swift self.motus.resigningActive( )

'"

Inside your 'func applicationWillEnterForeground(application: UIApplication) {'add the following:

"'swift self.motus.willEnterForeground( )

'"

Inside your 'func applicationSignificantTimeChange(application: UIApplication) {' add the following:

"'swift self.motus.significantTimeChange( )

'"

With this your application should be all-set to start using the Motus SDK, from the AppDelegate you can get the Motus SDK instance you just set up by using 'AppDelegate' from the 'UIApplication''s singleton 'sharedApplication( )' method like this:

"'swift let delegate: AppDelegate=UIApplication.sharedApplication( ).delegate as! AppDelegate delegate.motus.mileage.trips(responseHandler: {trips, error in if error !=nil { logw("|Sample: \(error!)")

return

} logw("|Trips from motus->\(trips)")

})

'"

In the above example, we're calling the trips for the current day, this method will go to the server and after that call is complete will call the 'responseHandler' we passed as a parameter.
"""

Commute

MotusSDK can identify commute trips, to do so, host application should pass a configuration object with a 'commuteDeduction' object set, this will be used to identify whether a trip is commute or not, trips that are identified as commute will be marked on the 'Trip' property 'commute'.

Example:
```swift
var config=MotusConfiguration(username: "FINAL_USERNAME", groupId: "[PROVIDED_GROUP_ID]")
config.baseLocation=CLLocationCoordinate2E(latitude: [LOCATION_LATITUDE], longitude: [LOCATION_LONGITUDE])
config.officeLocation=CLLocationCoordinate2E(latitude: [LOCATION_LATITUDE], longitude: [LOCATION_LONGITUDE])
self.motus.setup(configuration)
```

With above config, every time a trip is started/ended SDK will evaluate if its commute trip and mark the trip accordingly.

Configuring Stop Threshold

MotusSDK allows the host application to configure the stop threshold so stops are given certain time at the same geo-fence before being detected as a stop.

By default, the SDK uses 5 minutes (300 seconds) as the stop threshold, but in case needed it provides a way to configure this when calling the configuration function like:
```swift
//Inside your application AppDelegate
var config=MotusConfiguration(username: "FINAL_USERNAME", groupId: "[PROVIDED_GROUP_ID]")
config.autoStopThreshold=600.0
self.motus.setup(config)
```

Configuration

'MotusSDK' class provides the methods to setup and update the motus configuration. At your app startup you should initialize your Motus Object. p.e:
```swift
var config=MotusConfiguration(username: "FINAL_USERNAME", groupId: "[PROVIDED_GROUP_ID]") self.motus.setup(config)
```

Whenever you want to change the configuration, you should call the 'updateConfiguration' method. p.e:
```swift
let workdays=[Workday( ) Workday( ), . . . ]
let appDelegate=UIApplication.sharedApplication( ).delegate as! AppDelegate
appDelegate.motus.configuration.businessConfiguration=workdays
self.motus.updateConfiguration(config)
```

Motus Delegate

'MotusDelegate' provides interface for host apps to listen for events on that happen on the SDK and actuate over results of those events:

A very simple implementation of the delegate would be:
```swift
class MyAppMotusDelegate: MotusDelegate {
    func tripStarted(trip: Trip) { }
    func tripUpdated(trip: Trip) { }
    func tripsUpdated(trip: Trip) { }
    func locationPermissionsChanged(status: CLAuthorizationStatus){ }
    func tripEnded(trip: Trip)
    func batteryDegraded(reading: Double)
    func autoTrackingStarted( )
    func autoTrackingStopped( )
    func businessHoursStarted( )
    func businessHoursEnded( )
    func distanceUpdated(distance: Double){
        print("Today's distance updated to: \(distance) meters!.")
    }
}
```

In order to make the SDK aware of this implementation we should assign our motus sdk instance field 'delegate' with an instance of our implementation:
```swift
motusInstance.delegate=MyAppMotusDelegate( )
```

How do I use Motus SDK to track trips from my app?

'MotusMileage' class has the methods to track mileage on the host application, it uses iOS locationManager underneath to detect trips start and stop, to do so, the host application (your app) needs to call the 'startTracking' on the MotusMileage member that's inside the Motus SDK shared instance you create on the app delegate on the setup. p.e:
```swift
//Inside some button action or other:
let delegate: AppDelegate=UIApplication.shared Application( ).delegate as! AppDelegate
delegate.motus.mileage.startTracking( )
```

With this we're telling Motus SDK to start checking conditions for a trip start.

On the other side once our app doesn't need to track any trip we can call the 'stopTracking' method to avoid unneeded battery usage when our app is not needing to track trips. p.e.:
```swift
//Inside some button action or other:
let delegate: AppDelegate=UIApplication.shared Application( ).delegate as! AppDelegate
delegate.motus.mileage.stopTracking( )
```

How to get the list of trips for current day?

To get the list of the current day there are 2 options:

Get the latest local list of trips (synchronized frequently with the server)

To do this we will use the 'MotusMileage' instance by calling its method 'trips( ). p.e:
```swift
let delegate: AppDelegate=UIApplication.sharedApplication( ).delegate as! AppDelegate
let trips: [Trip]=delegate.motus?.mileage( ).trips( )
```

Make the SDK get the list of trips from the server and then synchronize with local trips To get this list of trips and trigger server sync we need to pass a 'responseHandler' to the 'trips( )' method, this 'responseHandler' will be called with the list of synchronized trips and/or an error if something happened in the middle of the synchronization.

```
"'swift
let                                              delegate:
   AppDelegate=UIApplication.sharedApplication( ).delegate as! AppDelegate
delegate.motus.mileage.trips(responseHandler:    {trips, error in
   if error !=nil {
      logw("|Sample: \(error!)")
      return
   }
   logw("|Trips->\(trips)")
   self.trips=trips;
})
"'
```

How do I get the list of trips for a specific day?
You can get the list of trips for a past day by passing the formatted date to the 'trips( )' method. this call will require server call, so we will need to pass a 'responseHandler' as well. p.e:

```
"'swift
let                                              delegate:
   AppDelegate=UIApplication.sharedApplication( ).delegate as! AppDelegate
delegate.motus.mileage.trips(forDate: "2016-02-20",responseHandler: {trips, error in
   if error !=nil {
      logw("|Sample: \(error!)")
      return
   }
   logw("|Trips->\(trips)")
   self.trips=trips;
})
"'
```

How can I delete the trips of a day?
Motus provides the reset function inside the MotusMileage class which delete the trips for a given date identifier.
For example if you want to delete the trips for December 28 of the 2016, this would the code needed:

```
"'swift
let                                              delegate:
   AppDelegate=UIApplication.sharedApplication( ).delegate as! AppDelegate
delegate.motus.mileage.reset(identifier:       "2016-12-28", responseHandler: {trips, error
   if error !=nil {
      print("|A good error \(error)")
      //Handle error
   }
   print("|Trips from 2016-12-28->\(trips)")
})
"'
```

We claim:
1. A method implemented by a server communicatively coupled to a mobile device in a specific vehicle driven by a driver, and to make available to a reimbursement software client a mileage rate for the specific vehicle, comprising:
   receiving, by the server, from the reimbursement software client, a request for a mileage rate for a driver ID of a driver and a vehicle ID for the specific vehicle;
   retrieving, by the server, vehicle-specific information stored in a memory of the server, based on the received vehicle ID;
   retrieving, by the server, driver-specific information stored in a memory of the server, based on the received driver ID;
   communicating, by the server and the mobile device, to periodically receive vehicle location information from the mobile device in the specific vehicle;
   determining, by the server, a fixed mileage reimbursement rate and a variable mileage reimbursement rate based on the vehicle-specific information, the driver-specific information, and the vehicle location information from the specific vehicle; and
   sending each of the fixed mileage reimbursement rate and the variable mileage reimbursement rate to the reimbursement software client to enable the reimbursement software client to determine a personalized mileage reimbursement amount for the driver.

2. The method of claim 1 wherein the vehicle-specific information comprises at least two of: depreciation, insurance, property tax, registration fees, sales tax, and a title fee.

3. The method of claim 1, wherein the driver-specific information comprises: a percentage of business use of the specific vehicle, as provided by the driver.

4. The method of claim 1, wherein the vehicle-specific information comprises: a percentage of business use of the specific vehicle, as provided by the specific vehicle.

5. The method of claim 1, wherein the vehicle ID is associated with the make and model of the specific vehicle.

6. The method of claim 1, further comprising updating on a periodic basis an average gas price stored in the memory of the server.

7. The method of claim 1, further comprising updating on a periodic basis a base MPG for a make and model of the specific vehicle, the base MPG stored in the memory of the server.

8. The method of claim 1, further comprising: updating on a periodic basis geographic information about the residence of the driver, where this information is stored in a memory of the server and is further used to determine the variable mileage reimbursement rate.

9. The method of claim 1, further comprising: updating on a periodic basis geographic information about the location of the specific vehicle, where this information is stored in a memory of the server and is further used to determine at least one of the fixed mileage rate and the variable mileage rate.

10. The method of claim 1, wherein at least one of the fixed mileage rate and the variable mileage rate is determined based on a country of residence of the driver.

11. The method of claim 1, wherein at least one of the fixed mileage rate and the variable mileage rate the is determined using one of a plurality of mileage reimbursement rate determination methods known to the server, based on geographic information of the driver.

12. The method of claim 1, wherein receiving, from the mobile device, mileage capture information based on miles driven by the specific vehicle further comprises: the client receiving the mileage capture information from the mobile device and forwarding it to the server.

13. The method of claim 1, wherein receiving, from the mobile device, mileage capture information based on miles driven by the specific vehicle further comprises: the server receiving the mileage capture information from the mobile device.

14. The method of claim 1, wherein at least one of the fixed mileage reimbursement rate and the variable mileage reimbursement rate is based on the vehicle-specific information, the driver-specific information and the mileage capture information is further based on fixed and variable costs for the driver and vehicle.

15. A method implemented by a server communicatively coupled to a mobile device in a specific vehicle driven by a driver, and to make available to a reimbursement software client a mileage rate for the specific vehicle, comprising:
receiving, by the server, from the reimbursement software client, a request for a mileage rate for a driver ID of a driver and
a vehicle ID for the specific vehicle;
retrieving, by the server, vehicle-specific information stored in a memory of the server, based on the received vehicle ID;
retrieving, by the server, driver-specific information stored in a memory of the server, based on the received driver ID;
communicating, by the server and the mobile device, to periodically receive vehicle location information from the mobile device in the specific vehicle;
determining, by the server, a mileage reimbursement rate based on the vehicle-specific information, the driver-specific information and the vehicle location information from the specific vehicle; and
sending the mileage reimbursement rate to the reimbursement software client to enable the reimbursement software client to determine a personalized mileage reimbursement amount for the driver, wherein the reimbursement rate sent to the mileage reimbursement software comprises two values: a fixed rate and a variable rate,
and further comprising:
updating on a periodic basis a metro percentage for a specific driver stored in the memory of the server; and
where the metro percentage is stored in a memory of the server and is further used to determine the mileage reimbursement rate.

16. A method implemented by a server to make available to a reimbursement software client a mileage rate for a specific driver and a specific vehicle, comprising:
retrieving from a memory of the server, by the server, personalized driver information and personalized vehicle information, based on the specific driver and the specific vehicle;
determining, by the server, fixed costs based on the personalized driver information and the personalized vehicle information, based on the specific driver and the specific vehicle;
communicating, by the server and a mobile device in the specific vehicle, to periodically receive vehicle location information from the specific vehicle;
determining variable costs based on the personalized driver information, the personalized vehicle information, and the vehicle location information;
determining a fixed mileage reimbursement rate for the specific driver and the specific vehicle based on the fixed costs;
determining a variable mileage reimbursement rate for the specific driver and the specific vehicle based on the variable costs; and
sending the fixed mileage reimbursement rate and the variable mileage reimbursement rate to the client to enable the client to determine a personalized mileage reimbursement amount for the driver.

17. The method of claim 16, further comprising:
receiving, by the server, mileage capture information for the specific vehicle from an app in the specific vehicle.

18. The method of claim 16, further comprising:
receiving, by the server, geographical location information for the specific vehicle from a database of geographical information, the database containing information for converting GPS data to location names.

19. A system, comprising:
an app associated with a mobile device associated with a vehicle capturing mileage information for the vehicle;
a server communicatively coupled to the app and receiving from the app the captured mileage information for the vehicle a reimbursement software client, sending a driver ID and a vehicle ID to the server, and
wherein the server returns to the reimbursement software client a fixed mileage reimbursement rate and a variable mileage reimbursement rate, based on the driver ID and the vehicle ID and further based on the captured mileage information.

20. The system of claim 19, further comprising receiving from the reimbursement software client geographical information for one of the driver and the vehicle and the server returning at least one of the fixed mileage reimbursement rate and the variable mileage reimbursement rate further based on the geographical information.

21. The system of claim 19, wherein the server periodically updates at least one of the following, which is further used to determine at least one of the fixed mileage reimbursement rate and the variable mileage reimbursement rate: depreciation, insurance, property tax, registration fees, sales tax, a title fee, a percentage of business use of the vehicle, and a percentage of metro driving of the vehicle.

* * * * *